United States Patent
Mizuno (10) Patent No.: US 9,774,215 B2
(45) Date of Patent: Sep. 26, 2017

(54) POWER CONVERSION APPARATUS

(71) Applicant: TOYOTA JIDOSHA KABUSHIKI KAISHA, Toyota-shi, Aichi-Ken (JP)

(72) Inventor: Yoshihito Mizuno, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 15/014,491

(22) Filed: Feb. 3, 2016

(65) Prior Publication Data

US 2016/0248316 A1 Aug. 25, 2016

(30) Foreign Application Priority Data

Feb. 24, 2015 (JP) .................................. 2015-034216

(51) Int. Cl.
*H02J 9/06* (2006.01)
*B60L 11/18* (2006.01)
(Continued)

(52) U.S. Cl.
CPC ................. *H02J 9/06* (2013.01); *B60L 11/18* (2013.01); *H02J 1/10* (2013.01); *H02J 7/1423* (2013.01); *Y10T 307/729* (2015.04)

(58) Field of Classification Search
CPC ...... B60L 1/00; B60L 11/1809; B60L 3/0046; B60R 16/0238; B60R 16/03; H02J 7/0031; H02J 3/04; H02J 9/04; H02J 3/06; H02J 9/06; H02J 3/42; H02M 1/10; Y02B 10/72; Y10T 307/658; Y10T 307/724; Y10T 307/729

USPC ........... 363/35, 40, 50, 51, 55, 56.02, 56.03, 363/56.04, 131, 132; 307/9.1, 10.1, 10.7, 307/72, 85, 86

See application file for complete search history.

(56) References Cited

U.S. PATENT DOCUMENTS 7,847,499 B2 * 12/2010 Nakamura .............. B60L 3/003
                                                318/400.27
2011/0095603 A1 * 4/2011 Lee ...................... B60L 11/1803
                                                307/10.1
(Continued)

FOREIGN PATENT DOCUMENTS

JP    H07-241001 A    9/1995
JP    2011-097721 A   5/2011
(Continued)

*Primary Examiner* — Nguyen Tran
(74) *Attorney, Agent, or Firm* — Oliff PLC (57) ABSTRACT

A capacitor connected to the battery in parallel; a step-up converter connected to the battery and the first capacitor; another capacitor connected to the step-up converter in parallel; an inverter connected to the step-up converter and the other capacitor in parallel; a potential line connecting a negative-side terminal of the battery to the capacitor, the step-up converter, the other capacitor, and the inverter in the stated order; and a bypass path formed, when a lower arm switching device of the step-up converter has a short-circuit failure, from cutting the reference electric potential line at a position including at least any one of a position between the negative-side terminal and the capacitor and another position between the step-up converter and the other capacitor. The bypass path bypasses the lower arm switching device and connects the negative-side terminal to the inverter.

6 Claims, 2 Drawing Sheets

(51) Int. Cl.
*H02J 1/10* (2006.01)
*H02J 7/14* (2006.01)

(56) References Cited

U.S. PATENT DOCUMENTS

| | | | |
|---|---|---|---|
| 2012/0013182 A1* | 1/2012 | Minegishi | B60K 6/445 307/9.1 |
| 2015/0155816 A1 | 6/2015 | Saito et al. | |
| 2016/0105112 A1 | 4/2016 | Ukegawa et al. | |

FOREIGN PATENT DOCUMENTS

| | | |
|---|---|---|
| JP | 2012-130108 A | 7/2012 |
| JP | 2013-132197 A | 7/2013 |
| JP | 2014-068428 A | 4/2014 |
| JP | WO2014207812 A1 | 2/2017 |
| WO | 2013/077221 A1 | 5/2013 |
| WO | 2014/010061 A1 | 1/2014 |

\* cited by examiner

POWER CONVERSION APPARATUS

BACKGROUND OF THE INVENTION

1. Field of the Invention

The present invention relates to a power conversion apparatus, and, in particular, to a power conversion apparatus capable of supplying power to an inverter from a battery via a step-up converter.

2. Description of the Related Art

In the related art, a power supply apparatus is known which has a fail-safe function against a failure (for example, see Japanese Laid-Open Patent Application No. 2012-130108). This power supply apparatus includes a switch inserted between a battery and a load on a main power line, and a bypass path bypassing the switch. The switch switches between a state of connecting between the battery and the load via the main power line and a state of disconnecting this connection. The bypass path is a power line bypassing the switch and connecting the battery and the load when the switch has a failure. In this power supply apparatus, even if the switch has a failure, the bypass path connects the battery and the load. Thus, it is possible to ensure power supply from the battery to the load.

SUMMARY OF THE INVENTION

According to one aspect of the present invention, a power conversion apparatus includes a battery; a first capacitor connected to the battery in parallel; a step-up converter connected to the battery and the first capacitor; a second capacitor connected to the step-up converter in parallel; an inverter connected to the step-up converter and the second capacitor in parallel; a reference electric potential line connecting a negative-side terminal of the battery to the first capacitor, the step-up converter, the second capacitor, and the inverter in an order of the first capacitor, the step-up converter, the second capacitor, and the inverter; and a bypass path that is formed, when a lower arm switching device included in the step-up converter has a short-circuit failure, as a result of the reference electric potential line being cut at a position including at least any one of a first position between the negative-side terminal and the first capacitor and a second position between the step-up converter and the second capacitor. The bypass path bypasses the lower arm switching device of the step-up converter and connects the negative-side terminal to the inverter.

Other objects, features and advantages of the present invention will become more apparent from the following detailed description when read in conjunction with the accompanying drawings.

DETAILED DESCRIPTION OF THE EMBODIMENTS

For the purpose of convenience, the description of the above-mentioned related art will be continued first.

As a system supplying power from a battery to a load, there is a system using a step-up converter where a switching device of an upper arm and a switching device of a lower arm are connected in series. In this system, it is considered to provide a bypass path connecting the battery to the load or an inverter for ensuring power supply from the battery to the load or the inverter even when the switching device of the lower arm device in the step-up converter has a short-circuit failure. In this case, it is necessary to provide such a switching point as to switch a power line supplying power from the battery to the load or the inverter between the main power line and the bypass path.

However, if the switching point is provided, an increase in the inductance of the power line inevitably occurs. Therefore, depending on an actual position of the switching point, a surge voltage may be increased so much as to exceed the withstand voltage of the step-up converter or the inverter. Alternatively, the cost required for avoiding such an increase in the surge voltage may be increased.

The embodiments have been made in consideration of this point, and an object of the embodiments is to provide a power conversion apparatus capable of suppressing an increase in a surge voltage generated due to presence of a switching point for switching between a main power line and a bypass path at low cost while ensuring power supply from a battery to an inverter with the bypass path when a step-up converter has a short-circuit failure.

Below, using the drawings, the power conversion apparatuses according to the embodiments will be described.

Figure 1:
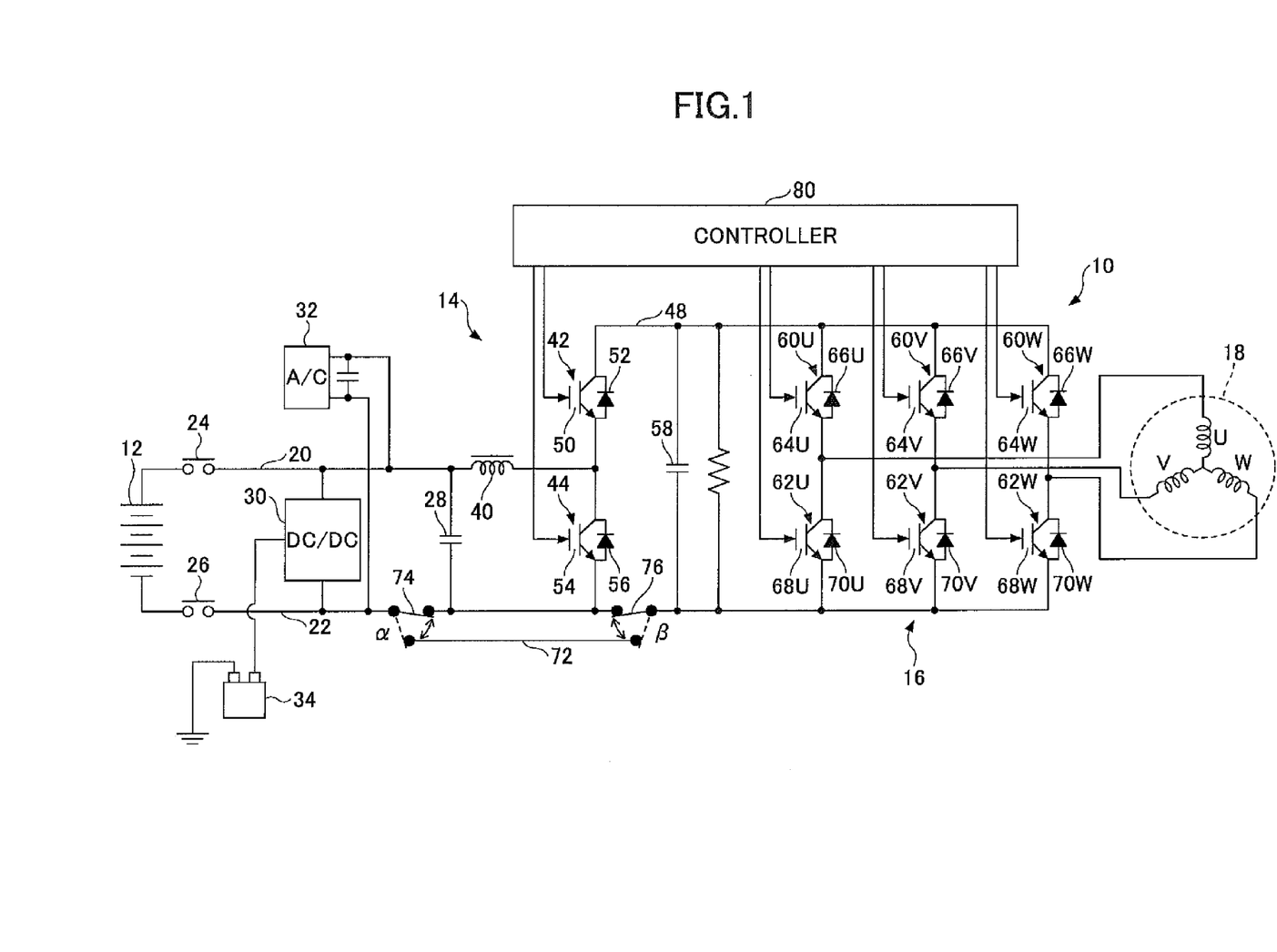
FIG. 1 illustrates a configuration of a power conversion apparatus according to an embodiment.

FIG. 1 illustrates the power conversion apparatus 10 according to the embodiment.

The power conversion apparatus 10 is, for example, a system mounted in an electric vehicle or a hybrid vehicle, increases the output voltage of an on-vehicle battery to acquire a greater voltage, supplies the greater voltage to a motor driving the vehicle, and drives the motor. Note that the power conversion apparatus 10 can have also such a configuration as to further supply power, generated by the motor, to the on-vehicle battery after lowering the voltage to charge the on-vehicle battery.

The power conversion apparatus 10 includes a battery 12, a step-up converter 14, an inverter 16 and a motor 18. The battery 12 is a chargeable lithium ion battery or nickel-metal hydride battery, and is a high-voltage battery capable of outputting a DC voltage of, for example, 240 volts. To the positive-side terminal of the battery 12, a positive-side power line 20 as a reference electric potential line is connected. To the negative-side terminal of the battery 12, a negative-side power line 22 as another reference electric potential line is connected.

In the positive-side power line 20, a relay switch 24 is inserted. Also, in the negative-side power line 22, another relay switch 26 is inserted. The relay switches 24 and 26 allow electrical conduction between the battery 12 and the step-up converter 14 with the positive-side power line 20 and the negative-side power line 22 and break the electric conduction, and are turned on and turned off according to instructions from a controller.

Between the positive-side power line 20 and the negative-side power line 22, a capacitor 28 is connected. In other words, the battery 12 has the capacitor 28 connected in parallel. The capacitor 28 is connected on the step-up converter 14 side of the relay switches 24 and 26 along the power lines 20 and 22. The capacitor 28 is a circuit device smoothing the output voltage of the battery 12 and stabilizes the voltage to be applied to the step-up converter 14 by the battery 12.

Also a load(s) such as a DC-DC converter 30, an air conditioner 32, and/or the like, can be connected between the positive-side power line 20 and the negative-side power line 22, as shown in FIG. 1. In this case, one terminal of each of the DC-DC converter 30 and the air conditioner 32 is connected to the positive-side power line 20 at a connection point between the relay switch 24 and the capacitor 28, and the other terminal thereof is connected to the negative-side power line 22 at a connection point between the relay switch 26 and the capacitor 28.

The DC-DC converter 30 is connected to a load such as an auxiliary battery 34 or such supplying power to various electric appliances at a predetermined voltage (for example, 12 volts or such). The DC-DC converter 30 includes a coil(s), a switching device(s), and/or the like. The DC-DC converter 30 is capable of lowering the output voltage of the battery 12 and then supplying the power to the auxiliary battery 34. The DC-DC converter 30 operates under the control of the controller. The air conditioner 32 has power supplied by the battery 12 and thus operates.

The step-up converter 14 is connected to the battery 12 and the capacitor 28 via the power lines 20 and 22. The step-up converter 14 is a circuit increasing the DC voltage, supplied by the battery 12 and the capacitor 28 via the power lines 20 and 22, up to a predetermined DC voltage (for example, 650 volts). The step-up converter 14 includes a coil 40, an upper arm device 42 and a lower arm device 44.

The coil 40 is inserted in the positive-side power line 20. One terminal of the coil 40 is connected to the positive-side terminal of the battery 12 (actually, one terminal of the capacitor 28 and the relay switch 24). The other terminal of the coil 40 is connected to the connection point between the upper arm device 42 and the lower arm device 44. The coil 40 has a function of charging power therein and discharging the power therefrom when voltage conversion is carried out between the battery 12 side and the inverter 16 side.

The upper arm device 42 and the lower arm device 44 are a pair of devices connected in series between a high-voltage-side power line 48 and the negative-side power line 22. The upper arm device 42 and the lower arm device 44 include power semiconductor devices, respectively. The connection point between the upper arm device 42 and the lower arm device 44 is connected to the positive-side power line 20 (actually, the other terminal of the coil 40).

The upper arm device 42 includes an insulated gate bipolar transistor (IGBT) 50, and a diode 52. The collector of the IGBT 50 is connected to the high-voltage-side power line 48, and the emitter thereof is connected to the connection point between the upper arm device 42 and the lower arm device 44, i.e., the other terminal of the coil 40. The IGBT 50 is a switching device that is turned on and turned off according to instructions of the controller that will be described later, and thus, carries out switching operations. The diode 52 is connected between the collector and the emitter of the IGBT 50 in antiparallel. The diode 52 permits only a flow of a current therethrough from the emitter to the collector of the IGBT 50.

The lower arm device 44 includes an IGBT 54 and a diode 56. The collector of the IGBT 54 is connected to the connection point between the upper arm device 42 and the lower arm device 44, i.e., the other terminal of the coil 40, and the emitter of the IGBT 54 is connected to the negative-side power line 22. The IGBT 54 is a switching device that is turned on and turned off according to instructions of the controller and thus carries out switching operations. The diode 56 is connected between the collector and the emitter of the IGBT 54 in antiparallel. The diode 56 permits only a flow of a current therethrough from the emitter to the collector of the IGBT 54.

A capacitor 58 is connected between the high-voltage-side power line 48 and the negative-side power line 22. In other words, the capacitor 58 is connected to the step-up converter 14 in parallel. The capacitor 58 is a circuit device smoothing the voltage between the high-voltage-side power line 48 and the negative-side power line 22, i.e., the output voltage of the step-up converter 14, and stabilizes the voltage applied by the step-up converter 14 to the inverter 16.

Also the inverter 16 is connected between the high-voltage-side power line 48 and the negative-side power line 22. The inverter 16 is connected to the step-up converter 14 and the capacitor 58 in parallel. The inverter 16 is a circuit converting the high DC voltage between the high-voltage-side power line 48 and the negative-side power line 22 supplied by the step-up converter 14 into an AC voltage.

The motor 18 is connected to the inverter 16. The motor 18 is a three-phase motor generating motive power (for example, motive power rotating driving wheels) from the AC power supplied by the inverter 16. Note that the motor 18 can be, for example, a motor generator generating power as a result of being driven by the driving wheels. The inverter 16 applies the AC voltage acquired from the conversion to the motor 18 and thus drives the motor 18.

The inverter 16 includes upper arm devices 60 (i.e., 60U, 60V and 60W in FIG. 1, as will be described later) and lower arm devices 62 (i.e., 62U, 62V and 62W in FIG. 1). The upper arm devices 60 and the lower arm devices 62 are pairs of devices, each pair being connected in series between the high-voltage-side power line 48 and the negative-side power line 22. The upper arm devices 60 and the lower arm devices 62 correspond to the respective phases of the motor 18 (i.e., the U phase, the V phase and the W phase). The upper arm devices 60 and the lower arm devices 62 for the respective phases include power semiconductor devices, respectively.

The upper arm device 60 of each phase includes an IGBT 64 (i.e., 64U, 64V or 64W in FIG. 1) and a diode 66 (i.e., 66U, 66V or 66W in FIG. 1). The collector of the IGBT 64 is connected to the high-voltage-side power line 48, and the emitter of the IGBT 64 is connected to the connection point between the upper arm device 60 and the lower arm device 62 of the same phase. The IGBT 64 is a switching device turned on and turned off according to instructions from the controller, and thus, carries out switching operations. The diode 66 is connected between the collector and the emitter of the IGBT 64 in antiparallel. The diode 66 permits only a flow of a current therethrough from the emitter to the collector of the IGBT 64.

The lower arm device 62 of each phase includes an IGBT 68 (i.e., 68U, 68V or 68W in FIG. 1) and a diode 70 (i.e., 70U, 70V or 70W in FIG. 1). The collector of the IGBT 68 is connected to the connection point between the upper arm device 60 and the lower arm device 62 (actually, the emitter of the IGBT 64 of the upper arm device 60) of the same phase, and the emitter of the IGBT 68 is connected to the negative-side power line 22. The IGBT 68 is a switching device turned on and turned off according to instructions from the controller, and thus, carries out switching operations. The diode 70 is connected between the collector and the emitter of the IGBT 68 in antiparallel. The diode 70 permits only a flow of a current therethrough from the emitter to the collector of the IGBT 68.

As mentioned above, the suffixes "U", "V" and "W" are attached to the respective reference numerals of the upper arm devices 60, the lower arm devices 62, the IGBTs 64 and 68, and the diodes 66 and 70 of the U phase, the V phase and the W phase, respectively. Thus, these devices are referred to as the upper arm devices 60U, 60V and 60W, the lower arm devices 62U, 62V and 62W, the IGBTs 64U, 64V, 64W, 68U, 68V and 68W, and the diodes 66U, 66V, 66W, 70U, 70V and 70W, in some cases.

The negative-side power line 22 is installed in such a manner as to connect the negative-side terminal of the battery 12 to the relay switch 26, the capacitor 28, the step-up converter 14 (actually, the emitter of the IGBT 54 of the lower arm device 44), the capacitor 58, and the inverter 16 (actually, the emitters of the IGBTs 68 of the lower arm devices 62) in the stated order. Note that the negative-side power line 22 can be installed also in such a manner as to connect the negative-side terminal the battery 12 to the DC-DC converter 30 and the air conditioner 32 in the stated order or the order reverse thereto between the relay switch 26 and the capacitor 28.

The power conversion apparatus 10 also includes a bypass path 72. The bypass path 72 bypasses such a part of the negative-side power line 22 as to bypass the lower arm device 44 of the step-up converter 14. The bypass path 72 is made of a solid bus bar, a power line, or such, made of copper or such. Note that the bypass path 72 can preferably be made of a parallel flat plate type wiring made of a solid bus bar from a viewpoint of reducing parasitic inductance and/or reducing a variation in the inductance.

One terminal of the bypass path 72 can be connected to the negative-side power line 22 at a connection point α on the primary side, i.e., the battery 12 side of the capacitor 28 (actually, between the relay switch 26 (that may alternatively be the DC-DC converter 30 or the air conditioner 32) and the capacitor 28). The other terminal of the bypass path 72 can be connected to the negative-side power line 22 at a connection point β on the secondary side, i.e., the inverter 16 side of the step-up converter 14 and the primary side, i.e., the step-up converter 14 side of the capacitor 58 (actually, between the step-up converter 14 and the capacitor 58).

The power conversion apparatus 10 further includes two changeover switches 74 and 76. One terminal of the changeover switch 74 is connected to the connection point α, and the changeover switch 74 is inserted in the negative-side power line 22 on the primary side, i.e., the battery 12 side of the capacitor 28 (actually, between the relay switch 26 (that may alternatively be the DC-DC converter 30 or the air conditioner 32) and the capacitor 28). One terminal of the changeover switch 76 is connected to the connection point F, and the changeover switch 76 is inserted in the negative-side power line 22 on the secondary side, i.e., the inverter 16 side of the step-up converter 14, and also, the primary side, i.e., the step-up converter 14 side of the capacitor 58 (actually, between the step-up converter 14 and the capacitor 58).

The respective changeover switches 74 and 76 switch such a connection path as to connect the negative-side terminal of the battery 12 to the inverter 16 between a main path, i.e., a corresponding part of the negative-side power line 22 connected to the step-up converter 14 and the bypass path 72 bypassing the step-up converter 14. Note that the changeover switches 74 and 76 can be those of a relay contact switching type or a mechanical contact switching type. The relays of the relay contact switching type can be those of a mechanical type or a semiconductor type. In this regard, the relays of a semiconductor type are advantageous from a viewpoint of reducing the inductance for suppressing a surge.

The changeover switches 74 and 76 are respectively turned on and turned off according to instructions from the controller. Actually, the changeover switches 74 and 76 are respectively turned off to switch the connection path into the corresponding part of the negative-side power line 22. The changeover switches 74 and 76 are respectively turned on to switch the connection path into the bypass path 72. The changeover switch 74 and the changeover switch 76 are turned on and turned off in synchronization with one another.

The power conversion apparatus 10 further includes the controller 80. The controller 80 is connected to the relay switches 24 and 26, the IGBTs 50 and 54 of the step-up converter 14, the IGBTs 64U, 64V, 64W, 68U, 68V and 68W of the inverter 16, and the changeover switches 74 and 76. The controller 80 controls turning on and turning off the relay switches 24 and 26, the IGBTs 50 and 54 of the step-up converter 14, the IGBTs 64U, 64V, 64W, 68U, 68V and 68W of the inverter 16, and the changeover switches 74 and 76, respectively.

The controller 80 determines whether any shutdown factor (for example, a high temperature, or the like) occurs concerning a process of converting the output power of the battery 12 and supplying the converted power to the motor 18. If the controller 80 determines that no shutdown factor occurs, the controller 80 turns on the relay switches 24 and 26. In this case, the controller 80 outputs such gate signals as to drive the IGBTs 50 and 54 of the step-up converter 14 in a PWM manner, and also, outputs such gate signals as to drive the IGBTs 64U, 64V, 64W, 68U, 68V and 68W of the respective phases of the inverter 16 in a PWM manner.

Also, the controller 80 detects various failures based on various states (for example, voltages, currents, and/or the like). In particular, the controller 80 detects a short-circuit failure (in other words, a short-circuit failure between the collector and the emitter) of the IGBT 54 of the lower arm device 44 in the step-up converter 14. Note that a detection of a short-circuit failure of the IGBT 54 can be carried out based on a result of comparison between the voltage at the collector and the voltage at the emitter of the IGBT 54. The controller 80 controls turning on and turning off the changeover switches 74 and 76 based on a determination result as to whether a short-circuit failure of the IGBT 54 occurs.

Below, operations of the power conversion apparatus 10 according to the embodiment will be described.

If, for example, a request to drive the motor 18 is given by the ignition of the vehicle being turned on or the like, the controller 80 of the power conversion apparatus 10 increases the output voltage of the battery 12 through the step-up converter 14, converts the thus increased DC voltage into the AC voltage by the inverter 16, and supplies the thus-acquired AC power to the motor 18. Note that it is possible that this process is stopped when the request to drive the motor 18 is stopped by the ignition of the vehicle being turned off, or the like.

Actually, when the voltage is applied by the battery 12 to the coil 40, a current flows in the order of: the positive-side terminal of the battery 12→the positive-side power line 20→the coil 40→the diode 52 of the upper arm device 42 of the step-up converter 14→the high-voltage-side power line 48→the capacitor 58 and the inverter 16→the negative-side power line 22→the negative-side terminal of the battery 12. In this case, the capacitor 58 is charged, and also, the coil 40 is charged.

When the IGBT 54 of the lower arm device 44 of the step-up converter 14 is turned on from the above-mentioned state of the current flowing, then a current flows in the order of: the positive-side terminal of the battery 12→the positive-side power line 20→the coil 40→the IGBT 54 of the lower arm device 44→the negative-side power line 22→the negative-side terminal of the battery 12. In this case, the amount of the current flowing through the above-mentioned path increases linearly with time, and the coil 40 is further charged along with the increase in the current amount. Note that, in this case, the capacitor 58 is discharged. Therefore, the power supply to the inverter 16 is maintained.

Next, if the IGBT 54 of the lower arm device 44 is turned off, then a current flows in the order of: the positive-side terminal of the battery 12→the positive-side power line 20→the coil 40→the diode 52 of the upper arm device 42 of the step-up converter 14→the high-voltage-side power line 48→the capacitor 58, the inverter 16 and the motor 18→the negative-side power line 22→the negative-side terminal of the battery 12. In this case, the amount of the current flowing through the above-mentioned path reduces linearly with time, and the coil 40 is discharged along with the reduction in the current amount.

Through the process, the output voltage of the step-up converter 14 is greater than the output voltage of the battery 12, and thus, a step-up operation is carried out. The capacitor 58 is charged, up to the thus increased voltage. Also, the power supply to the inverter 16 at the increased voltage is maintained. Thereafter, turning on and turning off the IGBT 54 of the lower arm device 44 are repeated, and thereby, a state of the DC power being supplied to the inverter 16 while the step-up converter 14 is applying the voltage greater than the output voltage of the battery 12 to the inverter 16 is continued.

In the inverter 16, the upper and lower arm devices 60 and 62 of the three phases are turned on and turned off with the respective phase differences of 120°, and the IGBTs 64U, 64V and 64W of the upper arm devices 60U, 60V and 60W, and the IGBTs 68U, 68V and 68W of the lower arm devices 62U, 62V and 62W are alternately turned on and turned off. Thus, the inverter 12 converts the DC voltage that is input from the step-up converter 14 side into the AC voltage which is then output to the motor 18.

Through the process, the power is supplied to the motor 18 from the battery 12 while the step-up converter 14 is applying the greater voltage to the motor 18. Thus, the motor 18 is driven. Therefore, in the embodiment, it is possible to drive the motor 18 with the power from the battery 12, and thereby, it is possible to ensure driving of the vehicle including the motor 18.

Figure 2:
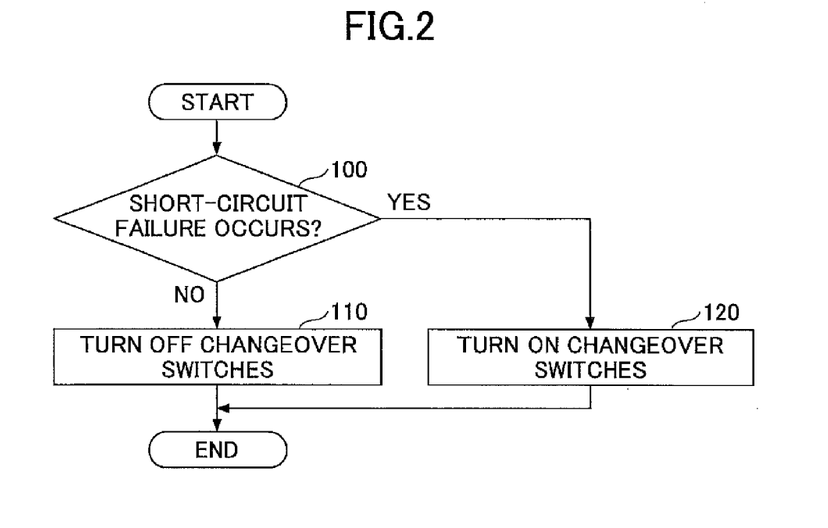
FIG. 2 is a flowchart of a control routine carried out in the power conversion apparatus.

FIG. 2 is a flowchart of one example of a control routine carried out by the power conversion apparatus 10 in the embodiment. The routine shown in FIG. 2 is carried out every predetermined time interval in the controller 80 during the motor 18 being driven.

In the power conversion apparatus 10, the controller 80 detects failures based on various states. In particular, the controller 80 determines whether the IGBT 54 of the lower arm device 44 of the step-up converter 14 has a short-circuit failure (step 100).

If the controller 80 determines in step 100 that the IGBT 54 has no short-circuit failure, the controller 80 turns off both the changeover switches 74 and 76, and thus, connects the negative-side terminal of the battery 12 to the capacitor 28 and the step-up converter 14 via the negative-side power line 22 (step 110). In this case, because the negative-side terminal of the battery 12 is connected to the capacitor 28 and the step-up converter 14 via the negative-side power line 22, the negative-side terminal of the battery 12 is connected to the inverter 16 via the capacitor 28, the step-up converter 14, and the capacitor 58.

Through the process, the output voltage of the battery 12 is increased by the step-up converter 14 to a greater voltage, and the power is supplied to the inverter 16 and the motor 18 from the battery 12 while the step-up converter 14 is applying the greater voltage to the inverter 16 and the motor 18. Therefore, as a result of the above-mentioned process, it is possible to drive the motor 18 at the greater voltage, and thereby, it is possible to drive the vehicle to cause it to travel in the normal state.

On the other hand, if the controller 80 determines in step 100 that the IGBT 54 has a short-circuit failure, the controller 80 turns on both of the changeover switches 74 and 76, and connects the negative-side terminal of the battery 12 to the bypass path 72 (step 120). In this case, the negative-side power line 22 is cut (opened) at the position between the relay switch 26 and the capacitor 28 (the connection point α), and also, at the position between the step-up converter 14 and the capacitor 58 (the connection point α). Also, the bypass path 72 is created whereby the negative-side terminal of the battery 12 is connected to the inverter 16 bypassing the lower arm device 44 of the step-up converter 14.

Through the process, the lower arm device 44 (actually, the emitter of the IGBT 54 and the anode of the diode 56) of the step-up converter 14 where the IGBT 54 has the short-circuit failure is separated from the negative-side power line 22 connected to the negative-side terminal of the battery 12 having the corresponding part replaced in the circuit by the bypass path 72. Thus, even if the IGBT 54 has the short-circuit failure, it is possible to prevent the electric potential of the connection point between the upper arm device 42 and the lower arm device 44 of the step-up converter 14 from being constantly coincident with the electric potential of the negative-side power line 22 (in other words, the electric potential of the negative-side terminal of the battery 12). Thus, even if the IGBT 54 has the short-circuit failure, it is possible to prevent a current that is output from the positive-side terminal of the battery 12 from flowing through the positive-side power line 20, and thereafter constantly flowing into the negative-side power line 22 via the lower arm device 44 of the step-up converter 14 to return to the negative-side terminal of the battery 12.

Also, through the above-mentioned process, the connection between the negative-side terminal of the battery 12 and the inverter 16 is maintained via the bypass path 72. Therefore, even if, as mentioned above, the lower arm device 44 of the step-up converter 14 is separated from the negative-side power line 22 connected to the negative-side terminal of the battery 12 having the corresponding part replaced in the circuit by the bypass path 72, it is possible to ensure the current path for returning from the inverter 16 side to the negative-side terminal of the battery 12 via the bypass path 72.

As mentioned above, if the lower arm device 44 is separated from the negative-side power line 22 connected to the negative-side terminal of the battery 12 having the corresponding part replaced in the circuit by the bypass path 72, the current that is output from the positive-side terminal of the battery 12 flows in the order of: the positive-side power line 20→the coil 40→the diode 52 of the upper arm device 42→the high-voltage-side power line 48→the capacitor 58, the inverter 16 and the motor 18→the negative-side power line 22→the connection point β→the bypass path 72→the connection point α→the negative-side power line 22, and thus returns to the negative-side terminal of the battery 12.

In this case, because it is not possible to increase the output voltage of the battery 12 by the step-up converter 14, it is not possible to supply power to the inverter 16 and the motor 18 from the battery 12 at the normal greater voltage. However, because it is possible to apply such a lower voltage as the output voltage of the battery 12 to the inverter 16 and the motor 18, it is possible to supply power to the inverter 16 and the motor 18 at the lower voltage from the battery 12. Therefore, even during the short-circuit failure of the IGBT 54, it is possible to ensure applying the voltage to the inverter 16 and the motor 18 from the battery 12, and thus, it is possible to continue driving the motor 18. Thereby, it is possible to ensure deriving the vehicle to cause it to travel although in a limited state (i.e., at a lower speed) in comparison to the normal state.

Also, in the embodiment, if the IGBT 54 has the short-circuit failure, the one terminal of the bypass path 72 is connected to the negative-side power line 22 at the connection point α, and also, the other terminal of the bypass path 72 is connected to the negative-side power line 22 at the connection point β. Thereby, the bypass path 72 is created. In other words, the connection path connecting the negative-side terminal of the battery 12 to the inverter 16 is switched between the corresponding part of the negative-side power line 22 that is the main path connected to the step-up converter 14 corresponding to the normal case and the bypass path 72 bypassing the step-up converter 14 corresponding to the case where the IGBT 54 has the short-circuit failure.

The bypass path 72 is connected to the negative-side power line 22 at the connection point α and the connection point β. The connection point α is on the primary side, i.e., the battery 12 side of the capacitor 28 (actually, between the relay switch 26 and the capacitor 28). The connection point β is on the secondary side, i.e., the inverter 16 side of the step-up converter 14, and the primary side, i.e., the step-up converter 14 side of the capacitor 58 (actually, between the step-up converter 14 and the capacitor 58).

For comparison purposes, a comparison example is assumed where the connection point β at which the other end of the bypass path 72 as a countermeasure against a short-circuit failure of the IGBT 54 is connected to the negative-side power line 22 is on the secondary side (the inverter 16 side) of the capacitor 58. In the comparison example, the connection point β results in an increase in the inductance in the circuit on the secondary side of the capacitor 58. As a result, the surge voltage on the secondary side of the capacitor 58 increases. In order to suppress the increase in the surge voltage on the secondary side of the capacitor 58, it is necessary to reduce the switching speeds of all the switching devices (IGBTs 64 and 68) on the secondary side of the capacitor 58, or install a snubber circuit such as a capacitor immediately adjacent to each arm device 60 or 62 on the secondary side of the capacitor 58. Thus, the cost for the countermeasure against the surge may increase dramatically.

In such a configuration that the connection point β at which the other end of the bypass path 72 as the countermeasure against the short-circuit failure of the IGBT 54 is connected to the negative-side power line 22 is on the secondary side of the step-up converter 14 and the primary side of the capacitor 58 as in the embodiment, the connection point β results in an increase in the inductance of the circuit on the primary side of the capacitor 58. As a result, the surge voltage on the primary side of the capacitor 58 increases. However, it is sufficient to install a snubber circuit such as a capacitor on the primary side of the connection point β and the secondary side of the step-up converter 14, or reduce the switching speed of the switching device (the IGBT 50) for suppressing the increase in the surge voltage on the primary side of the capacitor 58.

Therefore, according to the embodiment, the connection point β at which the other end of the bypass path 72 as the countermeasure against the short-circuit failure of the IGBT 54 is connected to the negative-side power line 22 is on the secondary side of the step-up converter 14 and the primary side of the capacitor 58. By thus determining the position of the connection point β according to the embodiment, it is possible to reduce the cost as the countermeasure against the surge in comparison to the comparison example where the connection point β is on the secondary side (the inverter 16 side) of the capacitor 58.

Also, according to the embodiment, the connection point α where the one end of the bypass path 72 as the countermeasure against the short-circuit failure of the IGBT 54 is connected to the negative-side power line 22 is on the primary side, i.e., the battery 12 side of the capacitor 28. By thus determining the position of the connection point α according to the embodiment, neither inductance increase on the secondary side of the capacitor 58 nor inductance increase on the primary side of the capacitor 58 such as those described above due to the presence of the connection point α occurs. Therefore, with the position of the connection point α according to the embodiment, it is possible to suppress the increase in the surge voltage on the secondary side of the capacitor 58, and also, it is possible to suppress the increase in the surge voltage on the primary side of the capacitor 58.

Therefore, with the power conversion apparatus 10 according to the embodiment, it is possible to ensure the power supply from the battery 12 to the inverter 16 by using the bypass path 72 even when the IGBT 54 of the lower arm device 44 of the step-up converter 14 has the short-circuit failure. Further, it is possible to suppress the increase in the surge voltage generated due to the presence of the connection points a and where the negative-side power line 22 is connected with the bypass path 72. Also, it is possible to suppress the increase of the surge voltage at low cost. Therefore, it is possible to lower the surge voltage to be less than or equal to the withstand voltage of the inverter 16 at low cost.

In the embodiment, the capacitor 28 is one example of a "first capacitor". The capacitor 58 is one example of a "second capacitor". The motor 18 is one example of a "load". The negative-side power line 22 is one example of a "reference electric potential line". The IGBT 54 of the lower arm device 44 of the step-up converter 14 is one example of a "lower arm switching device". The position of the connection point α is one example of a "first position". The position of the connection point β is one example of a "second position". The changeover switches 74 and 76 are examples of a "switching part". The controller 80 carrying out step 100 of the routine of FIG. 2 is one example of a "failure determination part". The controller 80 carrying out step 120 is one example of a "switching control part".

According to the embodiment, the other end of the bypass path 72 as the countermeasure against the short-circuit failure of the IGBT 54 is connected to the negative-side power line 22 at the connection point β on the secondary side of the step-up converter 14 and the primary side of the capacitor 58 (actually, between the step-up converter 14 and the capacitor 58). No snubber circuit is installed as the countermeasure against the increase in the surge voltage on the primary side of the capacitor 58 caused by the presence of the connection point β.

Figure 3:
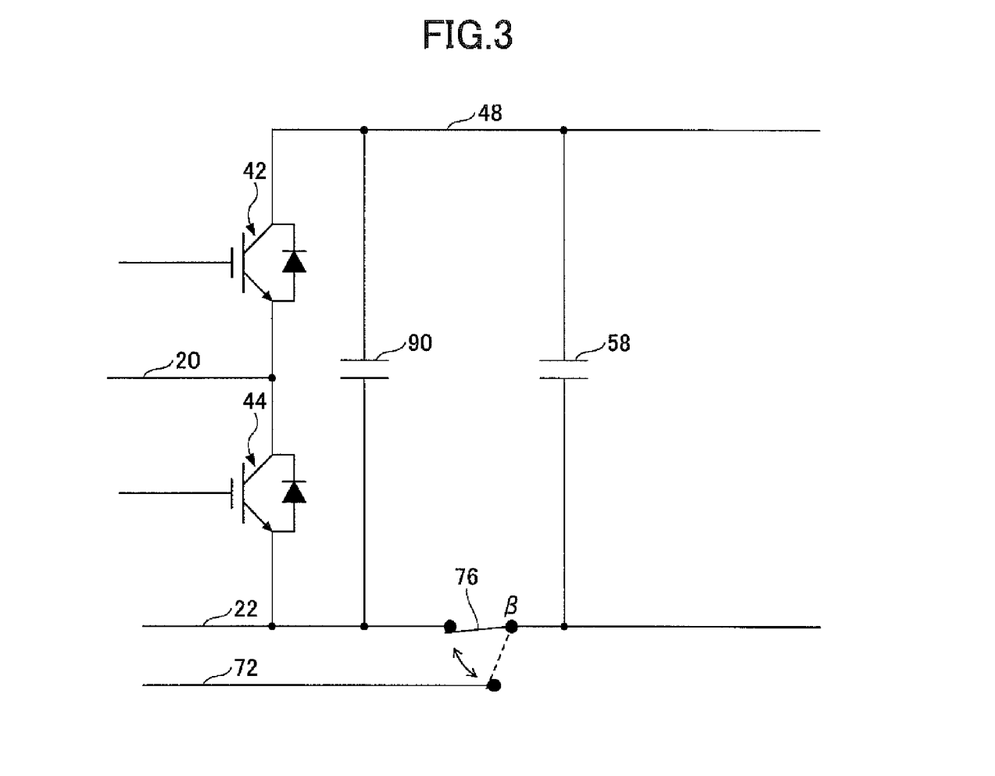
FIG. 3 partially illustrates a part of a power conversion apparatus according to a variant.

However, it is also possible to install a capacitor 90 as shown in FIG. 3 as the countermeasure against the increase in the surge voltage on the primary side of the capacitor 58 generated due to the presence of the connection point β. The capacitor 90 is used as a snubber circuit connected to the step-up converter 14 in parallel. One terminal of the capacitor 90 is connected to the negative-side power line 22 between the connection point β and the step-up converter 14 (actually, the emitter of the IGBT 54 of the lower arm device 44), and the other terminal of the capacitor 90 is connected to the high-voltage-side power line 48.

According to the variant described above using FIG. 3, even using the circuit configuration where the connection point β on the negative-side power line 22 is on the secondary side of the step-up converter 14 and the primary side of the capacitor 58, it is possible to positively suppress the increase in the surge voltage on the primary side of the capacitor 58 with the capacitor 90 as the snubber circuit. Note that, in the variant, the capacitor 90 is one example of a "third capacitor".

In the above-mentioned embodiments, the one end of the bypass path 72 is connected to the negative-side power line 22 at the connection point α on the primary side of the capacitor 28, and the other end of the bypass path 72 is connected to the negative-side power line 22 at the connection point β on the secondary side of the step-up converter 14 and the primary side of the capacitor 58. Then, if the IGBT 54 has the short-circuit failure, the negative-side power line 22 are cut at both the connection point α and the connection point β. However, the present invention is not limited thereto. It is also possible that the bypass path 72 is connected at respective points including at least any one of the connection point α and the connection point β. In this case, when the IGBT 54 has the short-circuit failure, the negative-side power line 22 is cut at the respective positions including the at least any one of the connection point α and the connection point β.

That is, if the IGBT 54 has the short-circuit failure, in a case where, for example, the negative-side power line 22 is cut at the connection point α by the changeover switch 74, it is possible that the negative-side power line 22 is cut at another position on the secondary side (the inverter 16 side) of the capacitor 58 by a corresponding changeover switch. Also, if the IGBT 54 has the short-circuit failure, in a case where, for example, the negative-side power line 22 is cut at the connection point β by the changeover switch 76, the negative-side power line 22 is cut at another position between the capacitor 28 and the step-up converter 14 by a corresponding changeover switch.

In the above-mentioned embodiments, the IGBTs 50, 54, 64 and 68 are used as the switching devices of the upper arm devices 42 and 60 and the lower arm devices 44 and 62 of the step-up converter 14 and the inverter 16 as the power semiconductor devices. However, the present invention is not limited thereto. As these switching devices, also power metal oxide semiconductor field effect transistors (power MOSFETs) can be used.

In the above-mentioned embodiments, the power conversion apparatus 10 is mounted in an electric vehicle or a hybrid vehicle. However, the present invention is not limited thereto. The power conversion apparatus 10 can be mounted also in an apparatus or the like other than a vehicle.

According to the above-mentioned embodiments, it is possible to provide a power conversion apparatus capable of suppressing an increase in a surge voltage in a low level caused by providing a switching point for switching between a main power line and a bypass path at low cost while ensuring power supply from a battery to an inverter with a bypass path when a step-up converter has a short-circuit failure.

Thus, the power conversion apparatuses 10 have been described in the embodiments. However, the present invention is not limited to these embodiments. Various modifications and/or implements such as combinations with part of or all of another embodiment(s), a replacement(s) with part of another embodiment(s), and so forth, can be made within the scope of the present invention.

The present application is based on and claims the benefit of priority of Japanese Priority Application No. 2015-034216, filed on Feb. 24, 2015, the entire contents of which are hereby incorporated herein by reference.

What is claimed is:

1. A power conversion apparatus comprising:
a battery;
a first capacitor connected to the battery in parallel;
a step-up converter connected to the battery and the first capacitor;
a second capacitor connected to the step-up converter in parallel;
an inverter connected to the step-up converter and the second capacitor in parallel;
a reference electric potential line connecting a negative-side terminal of the battery to the first capacitor, the step-up converter, the second capacitor, and the inverter in an order of the first capacitor, the step-up converter, the second capacitor, and the inverter; and
a bypass path that is formed, when a lower arm switching device included in the step-up converter has a short-circuit failure, as a result of the reference electric potential line being cut at a position including at least any one of a first position between the negative-side terminal and the first capacitor and a second position between the step-up converter and the second capacitor, the bypass path bypassing the lower arm switching device of the step-up converter and connecting the negative-side terminal to the inverter.

2. The power conversion apparatus as claimed in claim 1, wherein
the bypass path is formed, when the lower arm switching device has a short-circuit failure, as a result of the reference electric potential line being cut at a position including the second position, and
the power conversion apparatus further includes a third capacitor, one end of the third capacitor being connected to the reference electric potential line between the step-up converter and the second position, the third capacitor being connected to the step-up converter in parallel.

3. The power conversion apparatus as claimed in claim 1, further comprising:
a switching part switching a connection path connecting the negative-side terminal to the inverter, between a corresponding part of the reference electric potential line and the bypass path.

4. The power conversion apparatus as claimed in claim 2, further comprising:

a switching part switching a connection path connecting the negative-side terminal to the inverter, between a corresponding part of the reference electric potential line and the bypass path.

5. The power conversion apparatus as claimed in claim 3, further comprising:
a failure determination part determining whether the lower arm switching device has a short-circuit failure; and
a switching control part sending an instruction to the switching part to switch the connection path into the bypass path when the failure determination part determines that the lower arm switching device has a short-circuit failure.

6. The power conversion apparatus as claimed in claim 4, further comprising:
a failure determination part determining whether the lower arm switching device has a short-circuit failure; and
a switching control part sending an instruction to the switching part to switch the connection path into the bypass path when the failure determination part determines that the lower arm switching device has a short-circuit failure.

* * * * *